(12) United States Patent
McClure

(10) Patent No.: US 8,056,093 B1
(45) Date of Patent: Nov. 8, 2011

(54) ASYNCHRONOUS KERNEL PROCESSING FOR A GRAPHICS PROCESSING SYSTEM

(75) Inventor: Matthew D. McClure, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1007 days.

(21) Appl. No.: 11/567,814

(22) Filed: Dec. 7, 2006

(51) Int. Cl.
*G06F 15/163* (2006.01)

(52) U.S. Cl. ........................................ 719/323; 345/522

(58) Field of Classification Search ................. 719/321, 719/323; 345/522
See application file for complete search history.

(56) References Cited

U.S. PATENT DOCUMENTS

| | | | |
|---|---|---|---|
| 7,773,090 B1 * | 8/2010 | Diard et al. | 345/522 |
| 2002/0152331 A1 * | 10/2002 | Wong et al. | 709/321 |
| 2003/0140179 A1 * | 7/2003 | Wilt et al. | 709/321 |
| 2004/0160446 A1 * | 8/2004 | Gosalia et al. | 345/503 |
| 2005/0237326 A1 * | 10/2005 | Kuhne | 345/506 |
| 2005/0237330 A1 * | 10/2005 | Stauffer et al. | 345/531 |
| 2007/0088856 A1 * | 4/2007 | Zhang | 710/6 |
| 2007/0106999 A1 * | 5/2007 | Zhang | 719/323 |

OTHER PUBLICATIONS

Dekker, Edward N., and Joseph M Newcomer. Developing Windows NT Device Drivers. Addison Wesley Longman, Inc. (1999). pp. 491-500.*
Oney, Walter. Programming the Microsoft Windows Driver Model. Microsoft Press (1999). pp. 1-11, 426-438.*
MSDN Techinical Articles, "Scheduling, Thread Context, and IRQL" (Jul. 2004). pp. 1-18. [retrieved fromhttp://msdn.microsoft.com/en-us/library/ms810029.aspx on Jan. 12, 2010].*
U.S. Appl. No. 60/448,402 as incoporported by reference in US Pub. 2004/0160446, filed Feb. 18, 2003. "Microsoft Base Video Group: GPU Scheduler Overview". pp. 1-32.*

* cited by examiner

*Primary Examiner* — H. S. Sough
*Assistant Examiner* — Brian Wathen
(74) *Attorney, Agent, or Firm* — Cooley LLP

(57) ABSTRACT

An embodiment of the invention includes directing a kernel-mode driver to process at least a portion of a command stream configured to cause a graphics processing unit to perform an operation. The kernel-mode driver is used to issue a request to trigger creation of an asynchronous thread for processing the portion of the command stream.

10 Claims, 3 Drawing Sheets

US 8,056,093 B1

ASYNCHRONOUS KERNEL PROCESSING FOR A GRAPHICS PROCESSING SYSTEM

BRIEF DESCRIPTION OF THE INVENTION

The disclosed invention relates to asynchronous processing of data, and, in particular, to methods and apparatus related to asynchronous kernel processing for a graphics processing system.

BACKGROUND

The demands on graphics processing systems have continued to increase with the development of graphics intensive programs that require large numbers of computations and processing of large amounts of graphics related data. The operation of a graphics processing system can be disrupted by, for example, an upstream application that sends commands and data to a graphics processing unit. Because processing of the commands and data is typically serialized, upstream portions of a processing flow, for example, can be stalled (doing no productive work) while downstream portions within the processing flow are completing computations and/or resource allocation. Consequently, the serialized processing flow described above can result in the inefficient use of resources and processing delays for the graphics processing system.

Accordingly, a need exists for improved methods and apparatus for processing within a graphics processing system.

SUMMARY OF THE INVENTION

An embodiment of the invention includes directing a kernel-mode driver to process at least a portion of a command stream configured to cause a graphics processing unit to perform an operation. The kernel-mode driver is used to issue a request to trigger creation of an asynchronous thread for processing the portion of the command stream.

Another embodiment includes receiving an indicator that an asynchronous thread has been created in response to a request from a kernel-mode driver. The asynchronous thread is configured to process at least a portion of a command stream defined by a user-mode driver associated with the kernel-mode driver. The command stream is configured to cause a graphics processing unit to perform an operation. In response to the indicator, control of a computing resource associated with a kernel-mode driver is transferred to at least one of an application and the user-mode driver.

In another embodiment of the invention, computer-executable software code stored on a computer-readable storage medium includes code to receive a command stream associated with an application. The command stream is configured to direct a graphics processing unit operation. The software code includes code to determine whether to request creation of an asynchronous thread to process at least a portion of the command stream.

BRIEF DESCRIPTION OF THE DRAWINGS

Embodiments of the invention are described with reference to the accompanying drawings. In the drawings, identical or like reference numbers indicate identical or functionally similar elements.

DETAILED DESCRIPTION

Embodiments of the invention related to a kernel-mode driver configured to implement asynchronous processing within a processing flow to process and translate data and commands that are used by a graphics processing unit (GPU). The kernel-mode driver can be configured to receive a stream of commands that is defined by a user-mode driver in response to a function call(s) and/or data associated with an application (e.g., user-level application). The kernel-mode driver can be configured to process (e.g., perform resource allocation and synchronization) the stream of commands before submitting the stream of commands to the GPU. In some embodiments, the kernel-mode driver can be directed to process or handle processing of the stream of commands. The kernel-mode driver, which is partially allocated computing resources (e.g., a time-slice) to process the stream of commands, is configured to trigger the creation of an asynchronous thread to perform the resource allocation and synchronization so that the computing resources can be relinquished to the user-mode driver and/or application for the performance of other tasks. The user-mode driver can be a user-level driver, and the kernel-mode driver can be a kernel-level extension that plugs into an operating system application program interface (API).

Figure 1:
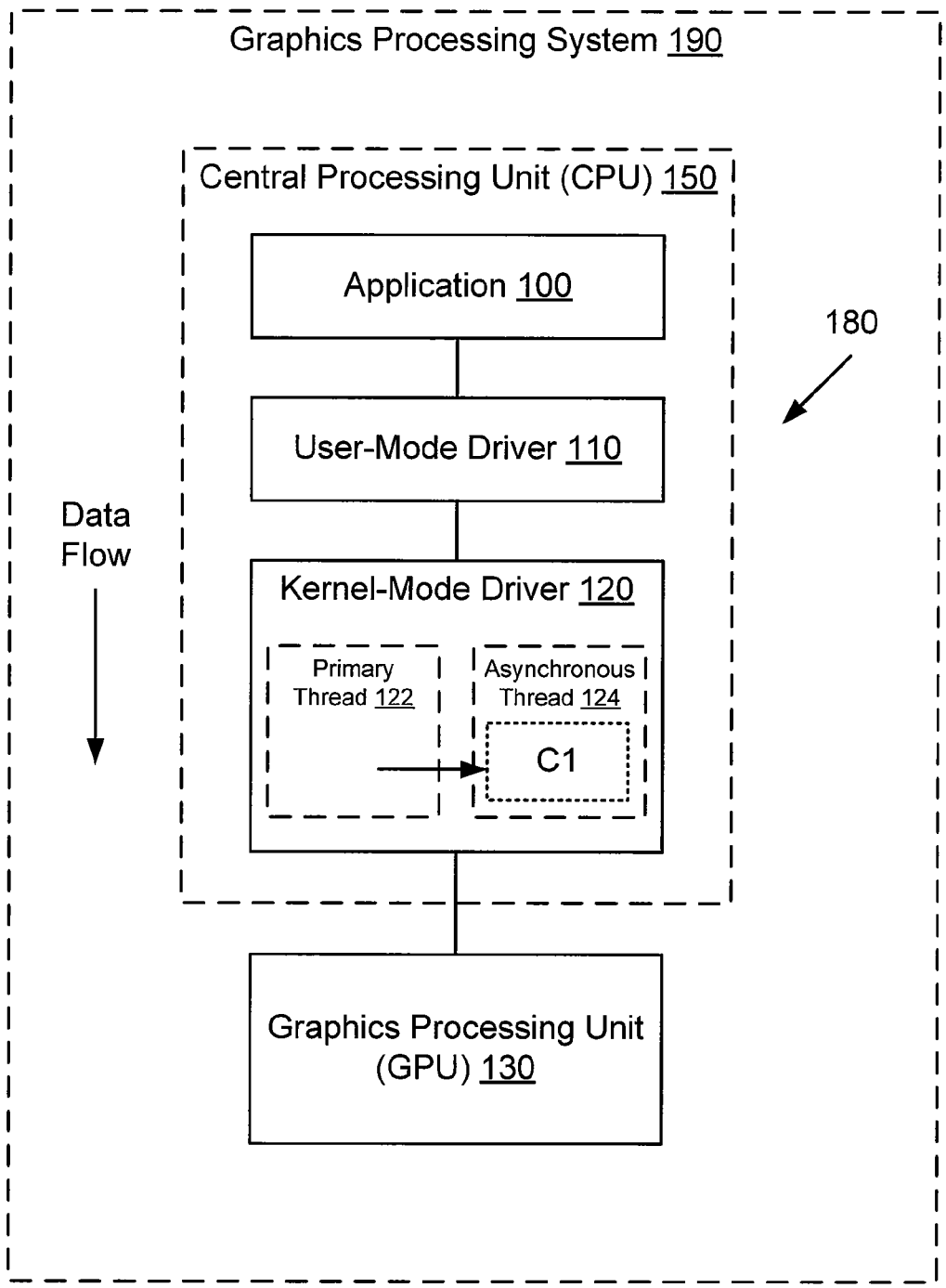
FIG. 1 is a schematic diagram that illustrates a kernel-mode driver configured to implement asynchronous processing, according to an embodiment of the invention.

Referring now to the drawings, FIG. 1 is a schematic diagram that illustrates a kernel-mode driver 120 configured to implement asynchronous processing within a graphics processing system 190, according to an embodiment of the invention. As shown in FIG. 1, the kernel-mode driver 120 is one of several hardware and/or software modules in a hierarchical processing flow 180 that is configured to produce/process data and commands associated with a graphics processing unit (GPU) 130. Function calls and/or data, which originate at the application 100, are translated into commands by the user-mode driver 110 and stored in a new or existing pushbuffer (e.g., ring buffer) where they can be accessed by modules in the processing flow 180. The commands are transmitted to the kernel-mode driver 120 for further processing and then submitted/made available to the graphics processing unit 130 where they can be used to perform, for example, graphics related operations (e.g., primitive calculations, pixel drawing, vertex computations, etc.). Operations/functions associated with the application 100, user-mode driver 110, and kernel-mode driver 120 are executed on a central processing unit (CPU) 150 based on a clock signal associated with the CPU 150.

As shown in FIG. 1, the kernel-mode driver 120 directs or transfers a stream of commands C1 (also can be referred to as a command stream) created by the user-mode driver 110 and stored in a pushbuffer (not shown) to an asynchronous thread 124 for processing. In some embodiments, the kernel-mode driver 120 directs only a portion of the stream of commands C1. The asynchronous thread 124 can be referred to as a secondary, an additional, or a parallel thread. The asynchronous thread 124 can be created by an operating system (not shown) in response to a request issued by the kernel-mode driver 120 using, for example, a standard API call. The processing of the command stream C1 using the asynchronous thread 124 enables the kernel-mode driver 120 to relinquish computing resources (e.g., a CPU time-slice and/or a pushbuffer) previously allocated for processing the command stream C1 to the user-mode driver 110 and/or application 100 for processing of other tasks. For example, the user-mode driver 110 and application 100 can use the relinquished computing resources to generate an additional command stream that can be processed by the kernel-mode driver 120 using the same primary thread 122 or a different primary thread (not shown). The primary thread 122 can be referred to as a parent thread. A more detailed description of the timing related to processing of command streams using one or more asynchronous threads is described in connection with FIG. 2.

The processing transferred to the asynchronous thread 124 by the kernel-mode driver 110 can be, for example, the execution of resource allocation and synchronization tasks. When the processing associated with the command stream C1 is completed by the asynchronous thread 124, the command stream C1 is submitted to the graphics processing unit 130.

Resource allocation includes, for example, managing the use of a virtual and/or physical memory location associated with the command stream C1. Synchronization tasks include, for example, performing readback of rasterization or readback of computation results from the GPU 130 at a specified time. In some embodiments, synchronization of command stream C1 with other command streams (not shown) and/or their respective memory resources may be necessary to ensure that each of the command streams is submitted to the GPU 130 in a specified order. The asynchronous thread 124 can be synchronized, for example, with a memory allocation mechanism (not shown) to ensure ordered processing. This synchronization can be performed to reduce the possibility that memory resources will be insufficient or prematurely allocated to a particular command stream.

The stream of commands C1 is a set of commands defined by the user-mode driver 110 based on a function call(s) and/or data received by the user-mode driver 110 from the application 100. Once the function call(s) and/or data are translated (e.g., defined) by the user-mode driver 110 into the stream of commands C1, the stream of commands C1 are stored in the pushbuffer where they can be accessed by downstream modules such as the kernel-mode driver 120. The pushbuffer can be, for example, a ring buffer allocated within a system memory (e.g., random access memory (RAM), shared RAM, and so forth). In some embodiments, the stream of commands C1 are hardware commands that can be used by the graphics processing unit 130 to perform graphics related operations.

If creation of the asynchronous thread 124 fails because, for example, the operating system denies creation of the asynchronous thread 124 for lack of computing resource (e.g., lack of memory, lack of CPU computing time), the processing flow 180 will process the command stream C1 in a serialized fashion. In some embodiments, serialized processing within the processing flow 180 is the default processing option. The computing resources (e.g., time-slice) allocated to the kernel-mode driver 120 will be used for processing the command stream C1, and control of CPU 150 computing resources will not be relinquished by the kernel-mode driver 120 to the user-mode driver 110 and/or application 100 until the command stream C1 has been submitted to the graphics processing unit 130.

In some embodiments, the creation of more than one asynchronous thread can be triggered by the kernel-mode driver 120. For example, the kernel-mode driver 120 can be configured to issue requests for multiple asynchronous threads that are each associated with, for example, separate command streams and/or different applications. Each of the command streams can be included in one master pushbuffer or multiple separate pushbuffers.

Figure 2:
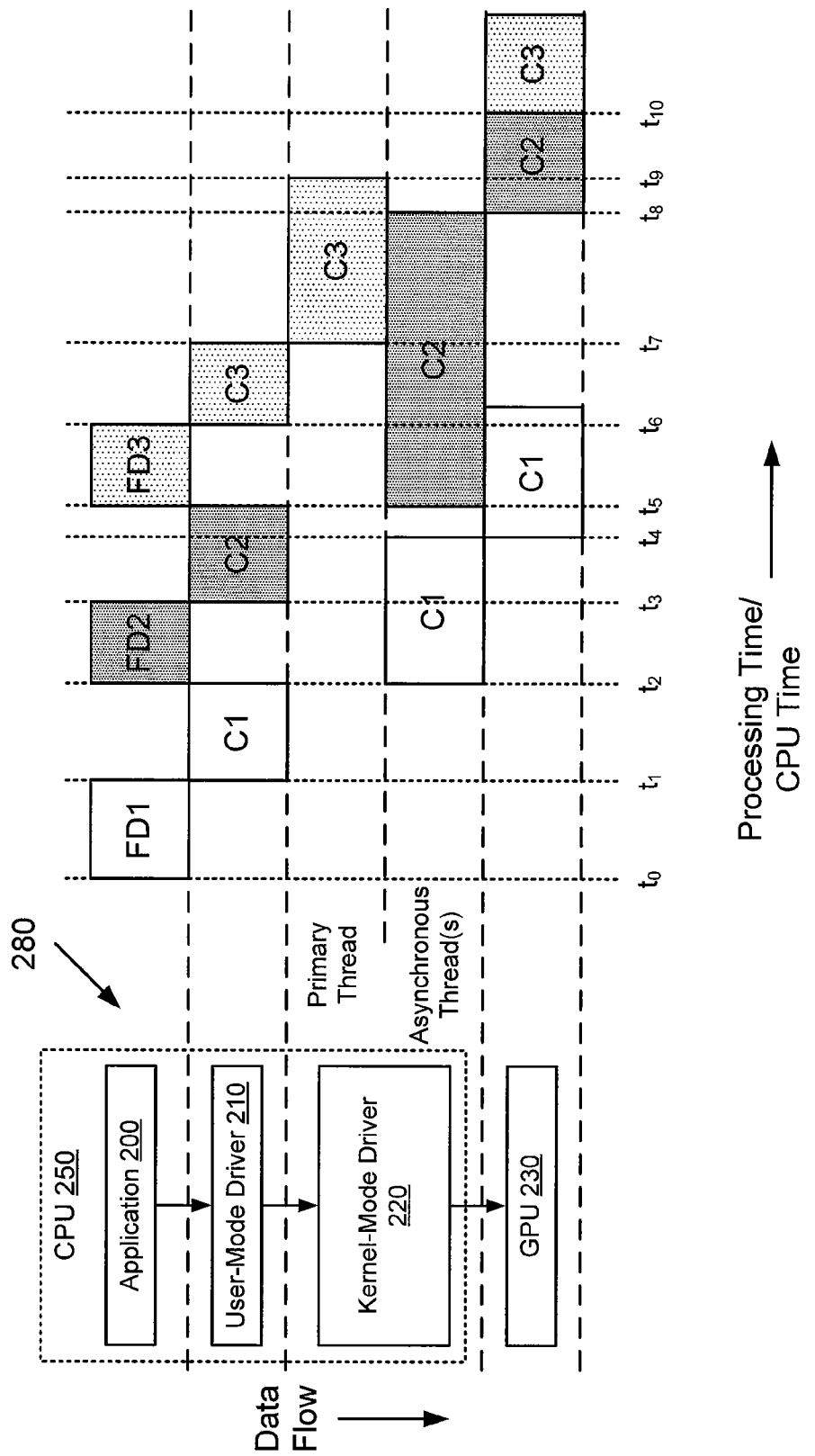
FIG. 2 is a schematic diagram that illustrates the timing and flow of functional calls and data and corresponding command streams related to modules within a processing flow, according to an embodiment of the invention.

FIG. 2 is a schematic diagram that illustrates the timing and flow of functional calls and/or data (FD) and corresponding command streams (C) as related to modules within a processing flow 280, according to an embodiment of the invention. Specifically, FIG. 2 illustrates the processing (e.g., resource allocation and/or synchronization) related to command streams using multiple threads that are triggered and/or controlled by a kernel-mode driver 220. As shown in the figure, processing time/CPU time progresses from left to right (x-axis) and data (e.g., FD and/or C) flows in a downward direction through the processing flow 280 (y-axis). The processing flow 280 includes a user-mode driver 210 that translates function calls and/or data that originate at an application 200 into commands that are processed by the kernel-mode driver 220 and finally by a graphics processing unit 230. Operations/functions associated with the application 200, user-mode driver 210, and kernel-mode driver 220 are executed on a central processing unit 250. A person of ordinary skill in the art should appreciate that the timing and flow of data through the modules within the processing flow 280 can vary depending upon, for example, process variation, design implementations, transport delays, timing delays through additional latches or modules, etc.

As illustrated in FIG. 2, functional call/data FD1 that originates at the application 200 starting at time $t_0$ is translated, at time $t_1$, by the user-mode driver 210 into command stream C1. After the command stream C1 is received at the kernel-mode driver 220, the kernel-mode driver 220 requests an asynchronous thread. In some embodiments, if the kernel-mode driver 220 determines that processing such as resource allocation and/or synchronization is not necessary, an asynchronous thread is not be requested and asynchronous thread creation and/or negotiation will not be performed. If an asynchronous thread is not created because resource allocation and/or synchronization is not necessary, the command stream C1 can be submitted directly to the GPU 230 from, for example, a primary thread of the kernel-mode driver 220. Resource allocation and/or synchronization determinations can be based on a policy used by, for example, the kernel-mode driver 220. The policy can be defined based on, for example, results of experimentation related to specified applications. The determination can also be based on factors such as CPU core resources/availability, CPU core capability, memory resource availability, operating system capabilities, and so forth.

The kernel-mode driver 220 is configured to surrender processing of the command stream C1 to the asynchronous thread when the asynchronous thread is created at time $t_2$. Additional computing resources (e.g., CPU time, memory) for processing of the command stream C1 are allocated to the asynchronous thread in response to the request and creation of the asynchronous thread. Consequently, computing resources originally allocated to kernel-mode driver for the processing of the command stream C1 can be diverted to the application 200 (or user-mode driver 210) as soon as the asynchronous thread is created at time $t_2$. In some embodiments, if creation of the asynchronous thread includes allocation of memory for processing the command stream C1, the pushbuffer previously used to store the command stream C1 can also be relinquished. At time t4, when the processing of the command stream by the asynchronous thread is completed, command stream C1 is submitted to the GPU 230 for further processing.

If the request for the asynchronous thread is denied or if the kernel-mode driver is not configured to trigger processing using an asynchronous thread, control of CPU resources could not be relinquished to the application at time $t_2$. In these scenarios, control of computing resources associated with CPU 250 could not be relinquished by the kernel-mode driver 220 to the application 200 until processing of the command stream C1 at the kernel-mode driver 220 was completed and the command stream C1 submitted to the graphics processing unit 230 at time $t_4$. In other words, the application 200 and/or user-mode driver 210 are stalled for a period of time until control of computing resources is transferred to the application 200 and/or user-mode driver 210. Creation of command stream C2 could not start until after time $t_4$.

Starting at time $t_2$ when control of computing resources associated with CPU 250 is transferred to application 200, functional call/data FD2 is originated at the application 200 and translated by the user-mode driver 210 into command stream C2. After the command stream C2 is received at the kernel-mode driver 220, the kernel-mode driver 220 requests an asynchronous thread and surrenders processing of the command stream C2 to the asynchronous thread when the asynchronous thread is created at time $t_5$ (note that the asynchronous thread created for command stream C2 is separate from the asynchronous thread created for command stream C1). Subsequently, control of computing resources associated with CPU 250 is transferred to the application 200, functional call/data FD3 that originates at the application 200 (starting at time $t_5$) is translated by the user-mode driver 210 into command stream C3 (starting at time $t_6$).

At time $t_7$ the user-mode driver 210 is ready to transmit the command stream C3 to the kernel-mode driver 220 for processing. In this embodiment, because the asynchronous thread is still processing command stream C2, the kernel-mode driver 220 processes command stream C3 using the primary thread. If an operating system API allows for multiple (e.g., two or more) asynchronous threads to be created, the kernel-mode driver 220 can request an additional asynchronous thread to process command stream C3 in addition to the asynchronous thread already being used to process command stream C2.

The command stream C2 is submitted to the graphics processing unit 230, at time $t_8$, after the processing of the command stream C2 is completed by the asynchronous thread. Although the primary thread has finished processing command stream C3 at time $t_9$, as shown in FIG. 2, command stream C3 is not submitted to the graphics processing unit 230 until the graphics processing unit 230 is ready to receive command stream C3 at time $t_{10}$.

In some embodiments, the kernel-mode driver 220 can be configured to trigger creation of an asynchronous thread to finish processing command stream C3 when command stream C2 is finished processing at time $t_8$ so that computing resources can be relinquished to the application 200. In some embodiments, the kernel-mode driver 220 can be configured to wait until processing of command stream C3 is completed by the primary thread before computing resources are relinquished to the application 200.

The kernel-mode driver 220 is configured to manage a list of the submitted command streams (e.g., C1 through C3) and their processing order (e.g., submission priority). The kernel-mode driver 220 can be configured to prevent any of the command streams from being submitted to the GPU 230 out of order. For example, newer processing threads can be managed and/or created by the kernel-mode driver 220 such that they are not submitted to the GPU 230 before an older thread and/or higher priority thread. In some embodiments, the kernel mode driver 220 can be configured to verify and/or ensure that command streams are submitted in a specified order by analyzing and/or using, for example, timestamp values generated and linked to GPU 230 resources and/or CPU 250 resources. The timestamp values can by synchronized with a clock associated with the GPU 230 and/or the CPU 250.

The kernel-mode driver 220 is configured to manage resources (e.g., common resources) associated with each of the command streams C1, C2, and C3 to avoid corruption and/or loss of data. For example, the kernel-mode driver 220 is configured to lock memory locations associated with pushbuffers, if necessary, to prevent overwriting of critical command data. The kernel-mode driver 220 can be configured to prevent control of computing resources from being transferred to the application 200 and/or user-mode driver 210. In some embodiments, the managing of resources is accomplished using standard API calls associated with an operating system.

In some embodiments, the kernel-mode driver 120 can be configured to create an asynchronous thread based on one or more defined policies. For example, the kernel-mode driver 220 can be configured to create or suspend creation of asynchronous threads based on, for example, command stream types. For example, the kernel-mode driver 220 can be configured to suspend (or prevent) triggering the creation of asynchronous threads, in some embodiments, when a feedback signal such as a pixel read-back associated with a particular command stream is required by the application 200 or by a condition associated with Open Graphics Library (GL). Although in this embodiment, the asynchronous threads were created on CPU 250, in some embodiments, the kernel-mode driver 220 can be configured to trigger the creation of asynchronous threads on one or more CPUs (not shown).

Figure 3:
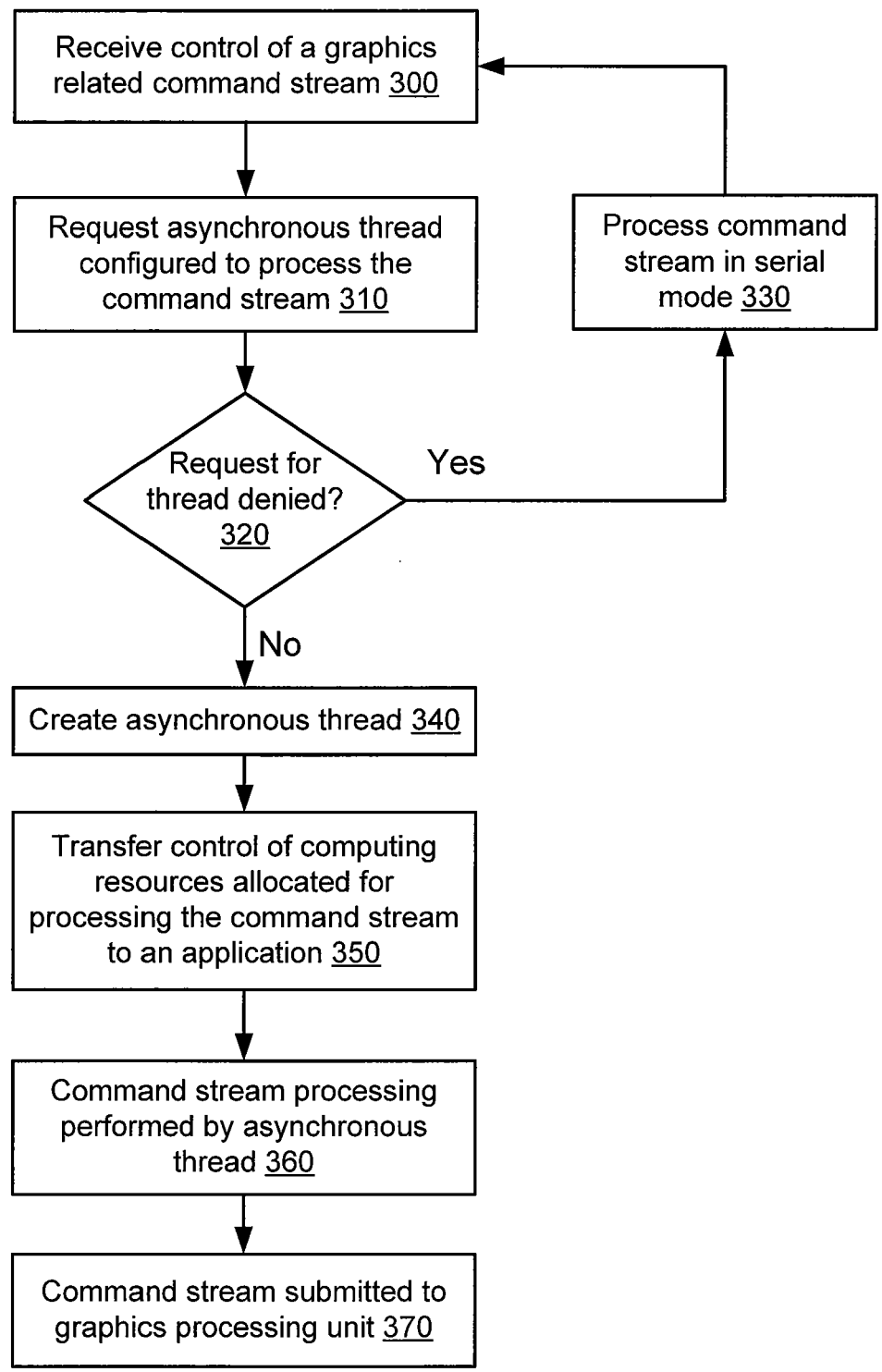
FIG. 3 is a flowchart that illustrates a method for asynchronous kernel processing for a graphics processing system, according to an embodiment of the invention.

FIG. 3 is a flowchart that illustrates a method for asynchronous kernel processing for a graphics processing system, according to an embodiment of the invention. As shown in FIG. 3, control (e.g., handling) of a graphics related command stream is received at 300. In some embodiments, the command stream can be stored in a memory location such as a ring buffer. The command stream can be a hardware command stream received by, for example, a kernel-mode driver within a processing flow configured to make the commands available to a graphics processing unit. The command stream can be translated by a user-mode driver from a function call, an array of commands created by an application, and/or graphics related data.

An asynchronous thread configured to process the command stream is requested at 310. The asynchronous thread can be created using, for example, a customized API or a standard operating system API. If the request for the asynchronous thread is denied at 320, the command stream is processed in a serial mode at 330. The asynchronous thread can be denied, for example, if computing resources for creating the asynchronous thread are not available or if a policy (e.g., threshold condition) established for creating the asynchronous thread is not satisfied. When the command stream is processed in a serial mode, the command stream is processed using resources already allocated to, for example, a kernel-mode driver configured to process the command stream.

If the request to create the asynchronous thread is not denied at 320, the asynchronous thread is created at 340. The asynchronous thread can be created based on, for example, operating system specifications. In some embodiments, the asynchronous thread can be created on a single central processing unit and/or distributed to multiple central processing units.

After the asynchronous thread has been created at 340, control of computing resources that were allocated for processing the command stream are transferred to an application at 350. An indicator that the asynchronous thread has been created can be used or can directly trigger the transfer of computing resources by, for example, a kernel-mode driver. The control can be transferred to an application that triggered the creation of the command stream or a different application. The computing resources can include, for example, a physical resource such as a memory (e.g., pushbuffer associated with the command stream) and/or a time resource such as a time-slice.

The command stream is then processed by the asynchronous thread at 360. The processing can include, for example, hardware and/or software resource allocation and/or synchronization related to data associated with a graphics processing unit. After the processing by the asynchronous thread has been completed, the command stream is submitted by the asynchronous thread to the graphics processing unit at 370.

The graphics processing unit can use the command stream to perform, for example, graphics related functions.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using computer code available under the trademark JAVA®, C++, or other object-oriented programming language and development tools. Additional examples of computer code include, but are not limited to, control signals, encrypted code, and compressed code.

In conclusion, embodiments of the invention provide, among other things, apparatus and methods related to asynchronous kernel processing for a graphics processing system. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:
   using a central processing unit, allocating control of a computing resource to a primary thread associated with a kernel-mode driver to process at least a portion of a command stream, the command stream configured to cause a graphics processing unit to perform an operation;
   issuing, using the central processing unit and the kernel-mode driver, a request to trigger creation of a secondary thread associated with the kernel-mode driver for processing the portion of the command stream; and
   directly in response to the creation of the secondary thread, relinquishing the control of the computing resource to at least one of a user-mode driver and an application,
   wherein the command stream is translated based on an array of commands generated by the application, and
   wherein the command stream is translated by the user-mode driver.

2. The method of claim 1, further comprising:
   performing, using the secondary thread, resource allocation associated with the portion of the command stream.

3. The method of claim 1, wherein the computing resource is at least one of a memory location and a processing time-slice associated with the central processing unit, the central processing unit being used to execute the kernel-mode driver.

4. The method of claim 1, wherein the secondary thread performs the processing at a first time, the command stream is submitted to the graphics processing unit at a second time, the second time being after the first time.

5. The method of claim 1, further comprising:
   subsequent to processing the portion of the command stream by the secondary thread, performing, using the graphics processing unit, the operation associated with the command stream.

6. A method, comprising:
   using a central processing unit, allocating control of a computing resource to a kernel-mode driver for processing at least a portion of a command stream;
   using the central processing unit, receiving an indicator that a parallel thread has been created in response to a request from the kernel-mode driver, the parallel thread being configured to process the portion of the command stream defined by a user-mode driver associated with the kernel-mode driver, the command stream being configured to cause a graphics processing unit to perform an operation; and
   directly in response to the indicator, transferring control of the computing resource allocated to the kernel-mode driver to at least one of an application and the user-mode driver,
   the method further comprising:
   directing the kernel-mode driver to process the portion of the command stream, the command stream being defined by the user-mode driver based on at least one of a function call associated with the application and data associated with the application.

7. The method of claim 6, wherein the command stream is a first command stream, the transferring includes transferring at a first time,
   the method further comprising:
   defining, at a second time, a second command stream using the computing resource, the second time being after the first time.

8. The method of claim 6, wherein the computing resource is at least one of a time-slice associated with the central processing unit and a memory location associated with the command stream, the central processing unit being used to execute the kernel-mode driver.

9. The method of claim 6, further comprising:
   performing, using the parallel thread, a synchronization function associated with the portion of the command stream.

10. The method of claim 6, further comprising:
    subsequent to processing the portion of the command stream by the parallel thread, performing, using the graphics processing unit, the operation associated with the command stream.

\* \* \* \* \*